United States Patent
Madsen

(10) Patent No.: US 12,038,131 B2
(45) Date of Patent: Jul. 16, 2024

(54) GREASE COLLECTION ARRANGEMENT

(71) Applicant: Siemens Gamesa Renewable Energy A/S, Brande (DK)

(72) Inventor: Ulrich Hedegaard Madsen, Børkop (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 135 days.

(21) Appl. No.: 17/234,956

(22) Filed: Apr. 20, 2021

(65) Prior Publication Data

US 2021/0332944 A1 Oct. 28, 2021

(30) Foreign Application Priority Data

Apr. 27, 2020 (EP) .................................. 20171473

(51) Int. Cl.
*F16N 31/00* (2006.01)
*F03D 80/70* (2016.01)
*F16C 33/66* (2006.01)

(52) U.S. Cl.
CPC ............. *F16N 31/00* (2013.01); *F03D 80/70* (2016.05); *F16C 33/6622* (2013.01); *F16N 2210/025* (2013.01); *F16N 2280/00* (2013.01)

(58) Field of Classification Search
CPC .................. F16N 31/00; F16C 33/6622; F05B 2260/602; F05B 2260/79; B08B 5/04; B08B 9/035; B08B 9/053; F03D 80/70
See application file for complete search history.

(56) References Cited

U.S. PATENT DOCUMENTS

| | | | | |
|---|---|---|---|---|
| 2,299,119 A | * | 10/1942 | Yeomans | F16N 31/00 384/130 |
| 4,818,706 A | * | 4/1989 | Starr | B01L 3/0203 222/642 |
| 5,174,732 A | * | 12/1992 | Hoya | F04B 15/02 417/900 |
| 2011/0293425 A1 | | 12/2011 | Numajiri et al. | |

(Continued)

FOREIGN PATENT DOCUMENTS

| CN | 102753820 A | 10/2012 |
|---|---|---|
| CN | 103591433 A | 2/2014 |

(Continued)

OTHER PUBLICATIONS

European Search Report and Written Opinion of the European Searching Authority issued Oct. 7, 2020 for Application No. 20171473.0.

*Primary Examiner* — Minh Truong
(74) *Attorney, Agent, or Firm* — Schmeiser, Olsen & Watts LLP

(57) ABSTRACT

Provided is a grease collection arrangement for collecting waste grease from a bearing, including a plurality of grease extraction valves, wherein each grease extraction valve is connected to a grease outlet of the bearing, an extraction line extending from each grease extraction valve to a common extraction line, a vacuum apparatus configured to create an under-pressure in the extraction lines, and a control module configured to selectively open and close a grease extraction valve. Also provided is a method of collecting waste grease from a bearing lubrication circuit using the grease collection arrangement.

13 Claims, 2 Drawing Sheets

(56) References Cited

U.S. PATENT DOCUMENTS

2014/0193263 A1     7/2014   Pasquet
2017/0152859 A1*   6/2017   Miller .................. F04D 25/045

FOREIGN PATENT DOCUMENTS

| CN | 205137028 U | 4/2016 |
| CN | 105972418 A | 9/2016 |
| CN | 107701902 A | 2/2018 |
| CN | 109404708 A | 3/2019 |
| CN | 110513594 A | 11/2019 |
| CN | 210319352 U | 4/2020 |
| EP | 3312493 A2 | 4/2018 |
| EP | 3318790 A1 | 5/2018 |

* cited by examiner

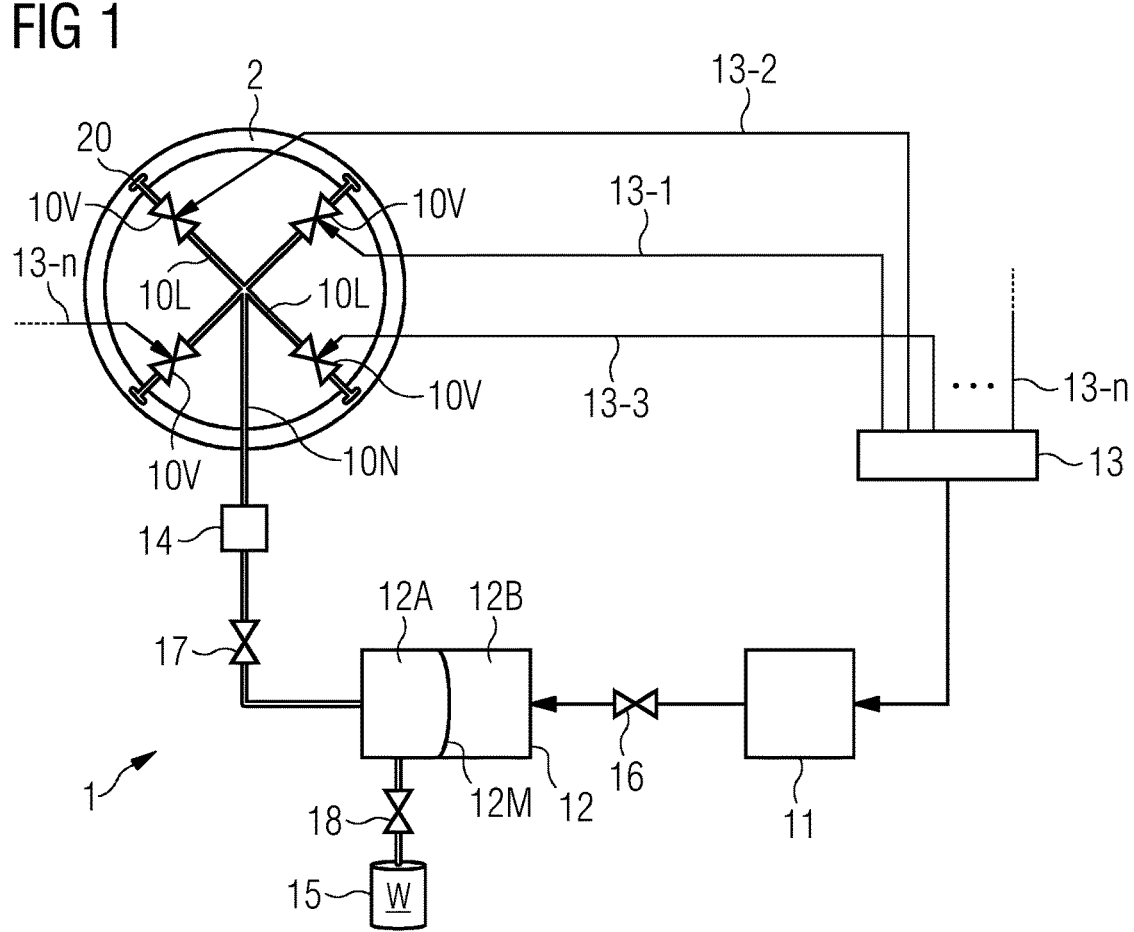
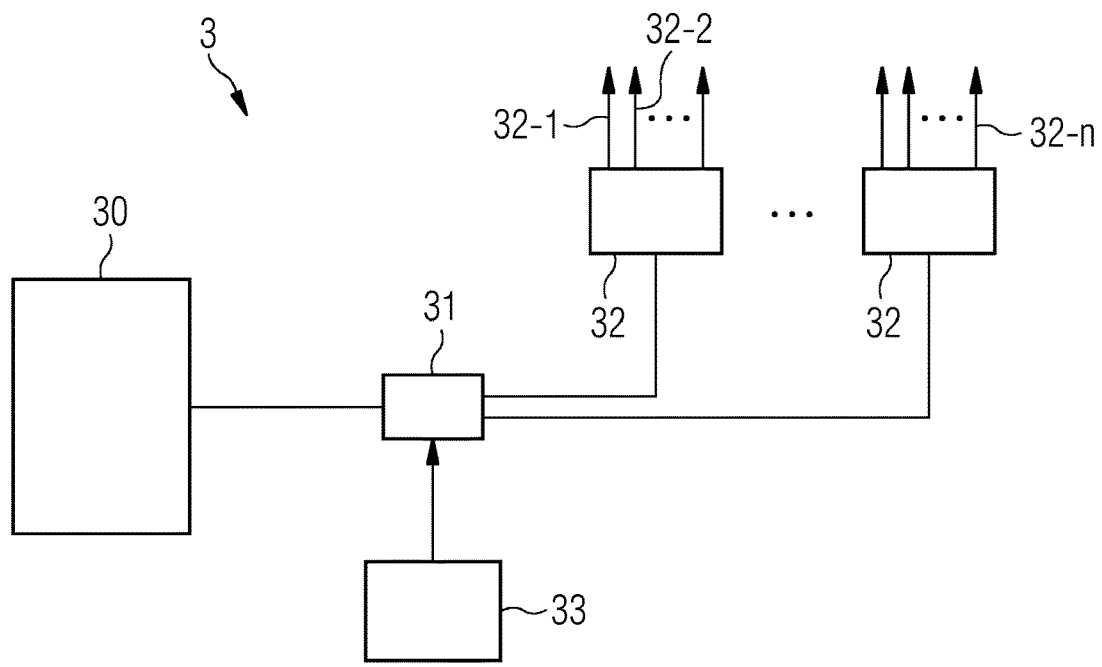

GREASE COLLECTION ARRANGEMENT

CROSS-REFERENCE TO RELATED APPLICATIONS

This application claims priority to European Application No. 20171473.0, having a filing date of Apr. 27, 2020, the entire contents of which are hereby incorporated by reference.

FIELD OF TECHNOLOGY

The following describes a grease collection arrangement for collecting waste grease from a bearing lubrication circuit.

BACKGROUND

Most large wind turbines have rotor blades that can be pitched about their long axes. The circular root end of a rotor blade terminates at a pitch bearing. A pitch system actuates one or more drive motors in response to a command from the wind turbine controller to pitch the rotor blade by a determined angular amount. A reliable lubrication of the pitch bearing is very important for various reasons. Damage to a pitch bearing can result in wind turbine downtime, with the attendant reduction in annual energy production. The reliability of the pitch bearings is particularly relevant in the case of an offshore wind turbine because service routines are expensive and hazardous.

A rotor blade of a large wind turbine can have a length in the region of 90 m, a mass in the region of 50000 kg and a root end diameter in the order of 5 m. The pitch bearing of such a large rotor blade may be realized as a roller bearing, a ball bearing, a slider bearing, etc. The stationary part and the rotating part of the bearing are separated at all times by a film of oil or grease. Since lubricant deteriorates over time, a pitch bearing is generally equipped with a lubricant system which is able to replenish the lubricant as required.

Various lubrication systems are available, and most systems include a grease reservoir and one or more feeder lines to grease inlets of the bearing. Controlled quantities of grease are fed at intervals into the bearing. In a single-line lubrication system, a pump station delivers lubricant through a single supply line to a lubricant metering device serving a single lubrication point. A pitch bearing of a large rotor blade can have several such lubrication points. In a progressive lubrication system, lubricant is continually transported to various lubrication points as long as the lubricant pump is running. When the pump is halted, the pistons of a metering device will also stop, and will "hold" their positions. When the pump starts supplying lubricant again, the metering device pistons resume from those positions.

Grease deteriorates over time, and the waste grease must be removed and collected in a controlled manner. The collected waste grease can then be removed, for example during a scheduled service routine, and disposed of. In the known systems, the ejection of waste grease depends on the injection of new grease. However, if any supply line is blocked, the removal of waste grease is interrupted.

Generally, the lubricant points are distributed evenly about a rotor blade pitch bearing, and this symmetry is reflected in the waste grease collection. However, a wind turbine rotor blade is not pitched about its entire 360°, and is generally only pitched within a narrower range, e.g. over 90°. This leads to a problem of waste grease "pooling" in certain parts of the lubrication system.

SUMMARY

An aspect relates to a waste grease collection system that overcomes the problems described above.

According to embodiments of the invention, the grease collection arrangement comprises a plurality of grease extraction valves, wherein each grease extraction valve is connected to a grease outlet of the bearing; an extraction circuit comprising a waste grease line extending between each grease extraction valve and a common extraction line leading to a single grease depository; a vacuum apparatus configured to create an under-pressure in the extraction lines; and a valve controller configured to selectively open and close a grease extraction valve.

With the inventive grease collection arrangement, waste grease is effectively sucked from the bearing grease outlets under vacuum. In contrast to prior art systems, the grease extraction is essentially independent of the grease supply system, i.e. the grease extraction events are independent of grease injection events.

A further advantage of the inventive grease collection arrangement is that because the valve controller can selectively open and close the grease extraction valves, waste grease is selectively extracted, i.e. the waste grease will only be sucked through a grease extraction valve that is open.

A further significant advantage is that the grease depository can be realized as a single container, or a single container assembly, positioned at an easily accessible location. This is because the extraction circuit is "fed" by all grease extraction valves, and the waste grease lines all feed to the common extraction line.

According to embodiments of the invention, the method of collecting waste grease from a bearing lubrication circuit using such a grease collection arrangement comprises the steps of closing the grease extraction valves; operating the vacuum apparatus to lower the pressure in the extraction lines; and opening a grease extraction valve to allow passage of waste grease into the extraction line and from there into the common extraction line. The cycle can be repeated at regular intervals, or as required. The arrangement of extraction lines feeding to the common extraction line may be referred to in the following as the "extraction circuit".

According to embodiments of the invention, a wind turbine rotor blade pitch assembly comprises a pitch bearing at an interface between the rotor blade root end and a hub of the wind turbine. The pitch assembly further comprises a lubrication system that is configured to deliver lubricant grease through a bearing lubrication circuit to grease inlets of the bearing. The pitch assembly further comprises an embodiment of the inventive grease collector arrangement for extracting waste grease from grease outlets of the bearing.

An advantage of the inventive rotor blade pitch assembly is that the waste grease is extracted more reliably from the bearing. Furthermore, since the waste grease is collected in a single depository, collection of the waste grease for disposal purposes can be carried out more quickly and with less effort, compared to the known systems which can require that a technician enter a crawl space to gain access to multiple small grease containers.

Particularly advantageous embodiments and features of the invention are given by the dependent claims, as revealed in the following description. Features of different claim categories may be combined as appropriate to give further embodiments not described herein.

In the following, it may be assumed that the rotor blade pitch assembly is for a large wind turbine, i.e. a wind turbine with rotor blades having a length in the order of 90 m and a root end diameter in the order of 5 m.

The vacuum system controller is configured to selectively actuate each grease extraction valve between its open position and its closed position. The controller can actuate each valve independently of the other grease extraction valves, and/or the controller can actuate two or more grease extraction valves simultaneously.

In a preferred embodiment of the invention, the vacuum apparatus comprises a vacuum pump configured to create a vacuum or under-pressure in the extraction circuit. This can be done by closing all grease extraction valves and running the vacuum pump until the pressure in the extraction lines has reduced to a maximum threshold level, preferably to a level of at most 90% of the ambient pressure (e.g. 900 mbar when ambient pressure is 1 bar), more preferably at most 85% of the ambient pressure (e.g. 850 mbar when ambient pressure is 1 bar). The effect of such a low pressure in the extraction circuit is that, as soon as a grease extraction valve is opened, any waste grease will be sucked into the extraction line. The "strength" of the under-pressure can be chosen according to the viscosity of the waste grease.

To collect the waste grease sucked into the extraction circuit, the inventive grease collection arrangement preferably comprises a two-part vacuum chamber to route the waste grease into a depository. In a preferred embodiment of the invention, the vacuum chamber is arranged between the common extraction line and the vacuum pump, and comprises a first chamber, a second chamber, and a membrane or diaphragm to separate the first chamber from the second chamber. The first chamber comprises an inlet fed by the common extraction line, and an outlet leading to a grease depository; in other words the first chamber is arranged between the common extraction line and the grease depository. The second chamber is connected to the vacuum pump. The membrane dividing the vacuum chamber allows an under-pressure to develop in the extraction circuit.

Before opening a grease extraction valve, all valves are closed and the pump is operated to continually reduce the pressure in the extraction circuit. In an embodiment, only one grease extraction valve is then opened. This means that a significant under pressure is "seen" by the corresponding extraction line when that grease extraction valve is opened. Any waste grease on the other side of the valve will be sucked into the extraction circuit. After a suitable duration, the grease extraction valve is closed again. The process can be repeated a number of times with the same grease extraction valve, or with a different grease extraction valve.

As indicated above, the lubrication system of a rotor blade pitch bearing is generally constructed to distribute grease evenly throughout the bearing, but grease can "pool" in specific regions of the bearing on account of the nature of the pitching process. Therefore, in a preferred embodiment of the invention, the method comprises a step of identifying which grease extraction valve may be positioned in a critical region of the bearing. Such a critical region can be determined on the basis of experience, for example. Any such grease extraction valve can be addressed more frequently to ensure that all waste grease is reliably extracted.

The quantity of grease that is extracted should be monitored so that the level of grease in the depository can be estimated for timely scheduling of a collection and disposal procedure. Equally, monitoring of the extracted quantity of grease can help to identify a potential problem in the lubricant system, or to identify a critical "pooling" region of the bearing as mentioned above. To this end, in a preferred embodiment of the invention, a flow-meter is arranged between the common collection point and the vacuum chamber. The flow-meter measures the quantity of extracted grease. The data collected and reported by the flow-meter can be reported back to a control center and/or recorded for readout during a service routine.

In a preferred embodiment of the invention, the grease collection arrangement comprises at least four grease extraction valves, more preferably at least six grease extraction valves. The number of grease extraction valves may be chosen according to the bearing design. For example, a large pitch bearing as described above can have an inner stationary race with 20 or more grease outlets, with each outlet connected to a grease extraction valve.

In an embodiment, the lubrication system is a progressive lubrication system, since a progressive system is more reliable than a single-line system and will continue feeding grease to the bearing as required.

The grease depository can be a container with a volume of 5000 ml or more and is preferably arranged in an easily accessible location, for example at an easily accessible position in the hub interior.

BRIEF DESCRIPTION

Some of the embodiments will be described in detail, with references to the following Figures, wherein like designations denote like members, wherein:

FIG. 1 shows an embodiment of a grease collection arrangement;

FIG. 2 shows components of a progressive lubrication system;

DETAILED DESCRIPTION

Figure 3:
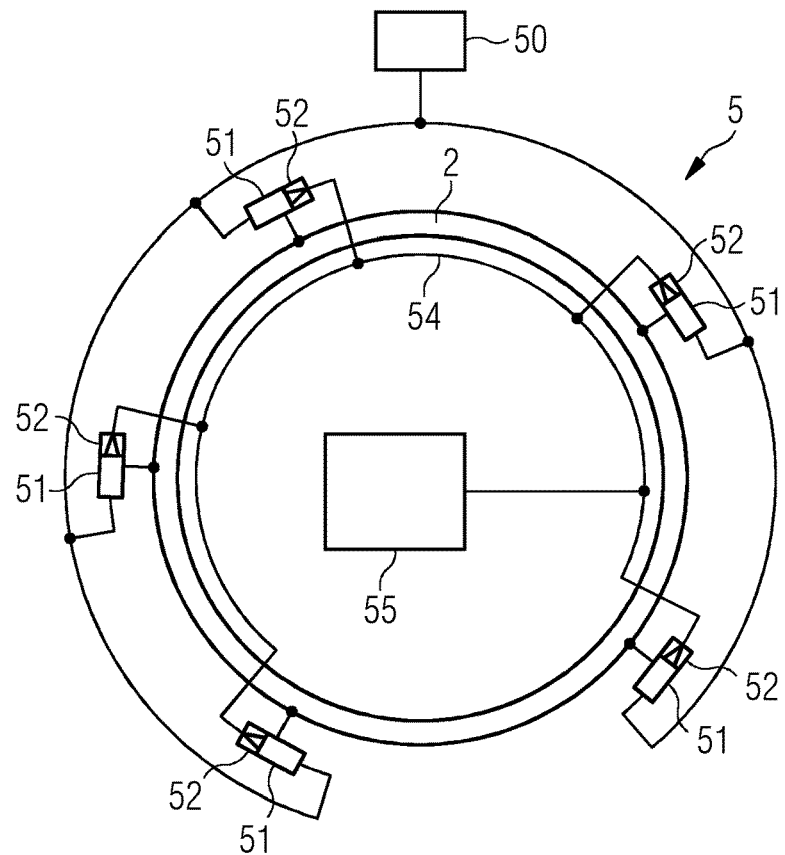
FIG. 3 shows a prior art bearing lubrication system.

FIG. 1 shows an embodiment of the grease collection arrangement 1. The diagram indicates a rotor blade pitch bearing 2 with a number of grease outlets 20 through which lubricant grease can be removed.

In the grease collection arrangement 1, waste grease is extracted under vacuum. To this end, the grease collection arrangement 1 comprises a number of individually controllable grease extraction valves 10V, one at each grease outlet 20. Each grease extraction valve 10V is connected to a waste line 10L, and these all feed into a common line 10N. The common line 10N leads to a waste grease container 15, via one chamber 12A of a vacuum chamber module 12. Only four grease outlets 20 are shown in the diagram for the sake of clarity, and therefore only four grease extraction valves 10V and waste lines 10L, but it shall be understood that the stationary race of a large pitch bearing may be provided with 20-30 such grease outlets 20, and the inventive grease collection arrangement 1 will also have a corresponding number of grease extraction valves 10V and waste lines 10L.

Each grease extraction valve 10V is controlled by a signal 13-1, 13-2, . . . , 13-$n$ issued by a control module 13. While all grease extraction valves 10V are closed, the control module 13 actuates a pump 11 that progressively withdraws air from the common line 10N and the waste lines 10L, via the second chamber 12B of the vacuum chamber module 12.

When the pressure in the extraction circuit has been reduced to a desired low level, valve 16 is closed in order to maintain the under-pressure in the chamber 12. A selected grease extraction valve 10V is opened by issuing an appropriate control signal. For example, the grease extraction valve 10V on the right side of the bearing 2 in the diagram is opened by signal 13-1. At the same time, valve 17 is opened. Any waste grease at the outlet 20 of the selected grease extraction valve 10V will be sucked into the common line 10N by the under pressure at the vacuum chamber 12.

Waste grease in the common line 10N passes through the first chamber 12A to the grease container 15. A membrane 12M ensures that grease remains on the one side of the vacuum chamber module 12. As the waste grease arrives in the secondary chamber 12A, valve 17 is closed, and valve 18 is opened. The vacuum pump 11 then alters its running direction in order to generate an overpressure in the primary chamber 12A, with the result that the waste grease is forced out of the primary chamber 12A and into the waste grease reservoir 15.

The diagram also shows a flow-meter 14 arranged in the common line 10N. The flow-meter 14 measures the quantity of extracted grease. The data collected and reported by the flow-meter 14 can be reported back to a control center and/or recorded for readout during a service routine. FIG. 2 shows components of a progressive lubrication system 3 which can be used to provide lubricant grease to a device such as a rotor blade pitch bearing (not shown). Lubricant grease is provided in a reservoir pump unit 30 that pumps the grease to a primary metering device 31, which in turn distributes the grease to a number of secondary metering devices 32 (two are shown here by way of example). Each secondary metering device 32 has a number of outlets connected by branch lines 32-1, 32-2, . . . , 32-n to grease entry points of the pitch bearing. The metering devices 31, 32 ensure that predetermined quantities of lubricant arrive at the grease entry points. The amount to be metered is determined by a control unit 33. Such a progressive lubrication system provides continuous lubrication when the pump is in operation. If the pump is halted, the pistons in the metering devices 31, 32 hold their positions, and resume from those positions when the pump is re-started.

FIG. 3 shows a prior art bearing lubrication system 5, in this case a single-line lubrication system. Here, grease is provided from a grease supply 50, and a number of grease injection modules 51 are used to inject lubricant grease into a bearing 2. Waste grease passes from a waste outlet 52 into a common line 54 that feeds into a container 55. However, a problem with this arrangement is that the waste grease collection is driven by the amount of grease added. Grease collection is therefore only done when lubricant grease is replenished. If any hose of the lubricant circuit becomes faulty for any reason, the entire system is compromised and the pitch system must be halted for repair.

Figure 4:
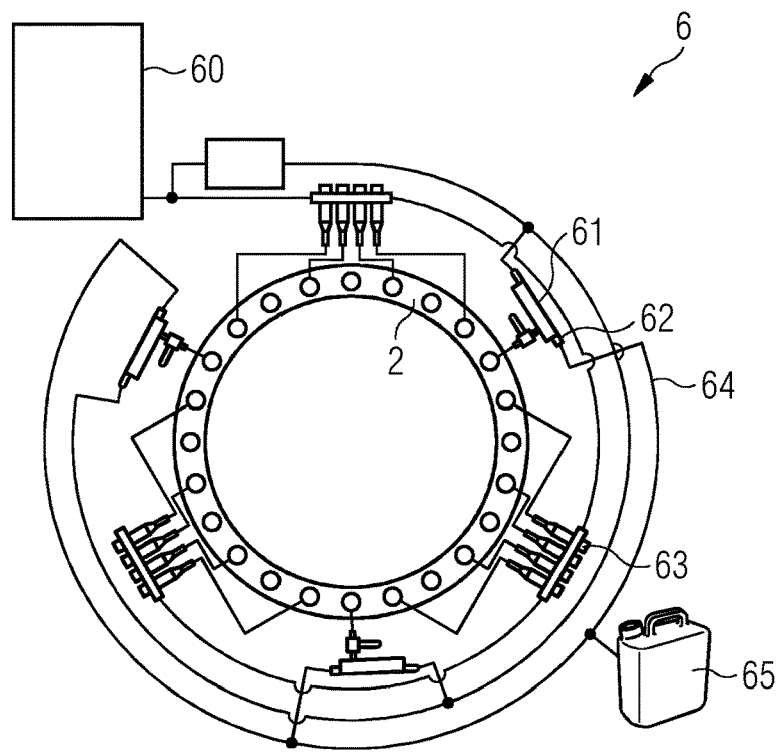
FIG. 4 shows a prior art bearing lubrication system.

FIG. 4 shows another prior art single-line lubrication system 6 for a rotor blade pitch bearing. Here, grease is provided from a grease supply 60, and waste grease passes from a waste outlet 62 of a single-line ejector 61 into a common line 64 that feeds into a container 65. In this case also, the waste grease collection is driven by the amount of grease added, and waste grease is only collected when lubricant grease is replenished.

Although embodiments of the present invention has been disclosed in the form of preferred embodiments and variations thereon, it will be understood that numerous additional modifications and variations could be made thereto without departing from the scope of embodiments of the invention.

For the sake of clarity, it is to be understood that the use of "a" or "an" throughout this application does not exclude a plurality, and "comprising" does not exclude other steps or elements.

The invention claimed is:

1. A grease collection arrangement for collecting waste grease from a bearing, comprising:
    a plurality of grease extraction valves, wherein each grease extraction valve is connected to a grease outlet of the bearing;
    a plurality of extraction lines, each extraction line extending from one of the plurality of grease extraction valves and converging to a common extraction line;
    a vacuum apparatus comprising a vacuum pump and a vacuum chamber arranged in the common extraction line, configured to create an under-pressure in the extraction line and the common extraction line, wherein the vacuum pump, when actuated, progressively withdraws air from the common extraction line, and the vacuum chamber comprises a first chamber at a first side of the vacuum chamber, a second chamber at a second side of the vacuum chamber, and a membrane to separate the first chamber from the second chamber and to ensure that grease remains within the first chamber on the first side of the vacuum chamber, the first chamber including an inlet fed by the common extraction line and an outlet leading to a waste grease reservoir;
    a first valve arranged in the common extraction line, upstream from the vacuum chamber;
    a second valve arranged between the vacuum chamber and the vacuum pump that is selectively closed to maintain the under-pressure in the vacuum chamber;
    a third valve positioned between the vacuum chamber and the waste grease reservoir; and
    a control module configured to selectively open and close a grease extraction valve of the plurality of grease extraction valves, wherein, when the grease extraction valve is open, the first valve is open to suck grease into the common extraction line, and when the first valve is closed, the third valve is opened and the vacuum pump alters a running direction to create an overpressure in the first chamber of the vacuum chamber to force the grease out of the first chamber and into the waste grease reservoir.

2. The grease collection arrangement according to claim 1, wherein the first chamber is arranged between the common extraction line and the waste grease reservoir.

3. The grease collection arrangement according to claim 1, comprising a flow-meter arranged in the common extraction line.

4. The grease collection arrangement according to claim 1, further comprising at least 16 grease extraction valves.

5. A wind turbine rotor blade pitch assembly comprising:
    a pitch bearing comprising a plurality of grease outlets for a removal of lubricant grease;
    a lubrication system configured to deliver lubricant grease through a lubrication circuit to the pitch bearing; and
    the grease collection arrangement according to claim 1 for extracting waste grease through the plurality of grease outlets of the pitch bearing.

6. The wind turbine rotor blade pitch assembly according to claim 5, wherein the plurality of grease outlets are provided in a stationary raceway of the pitch bearing.

7. The wind turbine rotor blade pitch assembly according to claim 5, wherein the lubrication system is a progressive lubrication system.

8. The wind turbine rotor blade pitch assembly according to claim 5, wherein a grease depository is arranged in an interior of a wind turbine hub.

9. A method of collecting waste grease from a bearing lubrication circuit using the grease collection arrangement according to claim 1, the method comprising:
 closing the plurality of grease extraction valves;
 actuating the vacuum apparatus to create the underpressure in the extraction line and the common extraction line; and
 opening a grease extraction valve to allow passage of waste grease into the common extraction line.

10. The method according to claim 9, wherein only one grease extraction valve is opened at any one time.

11. The method according to claim 9, further comprising identifying a grease extraction valve positioned in a critical region of the bearing, and more frequently opening that grease extraction valve.

12. The grease collection arrangement according to claim 1, wherein the plurality of extraction lines converge to the common extraction line from more than two different circumferential locations along the bearing.

13. The grease collection arrangement according to claim 1, wherein the plurality of extraction lines includes more than two extraction lines that converge to the common extraction line.

\* \* \* \* \*